US009090732B2

(12) United States Patent
Poppe et al.

(10) Patent No.: US 9,090,732 B2
(45) Date of Patent: *Jul. 28, 2015

(54) COATING COMPOSITION HAVING A HIGH SCRATCH RESISTANCE AND WEATHERING STABILITY

(75) Inventors: Andreas Poppe, Shanghai (CN); Sabine Holtschulte, Ascheberg (DE); Björn Feldmann, Münster (DE); Oliver Hilge, Drensteinfurt (DE); Günter Klein, Münster (DE)

(73) Assignee: BASF Coatings GmbH, Muenster (DE)

(*) Notice: Subject to any disclaimer, the term of this patent is extended or adjusted under 35 U.S.C. 154(b) by 977 days.

This patent is subject to a terminal disclaimer.

(21) Appl. No.: 12/808,987

(22) PCT Filed: Dec. 18, 2008

(86) PCT No.: PCT/EP2008/010810
§ 371 (c)(1),
(2), (4) Date: Sep. 29, 2010

(87) PCT Pub. No.: WO2009/077182
PCT Pub. Date: Jun. 25, 2009

(65) Prior Publication Data
US 2011/0059251 A1 Mar. 10, 2011

(30) Foreign Application Priority Data
Dec. 19, 2007 (DE) .................. 10 2007 061 855

(51) Int. Cl.
*C08G 18/28* (2006.01)
*C08L 83/04* (2006.01)
*B05D 3/02* (2006.01)
*B05D 7/00* (2006.01)
*C08G 18/20* (2006.01)
*C08G 18/62* (2006.01)
*C08G 18/77* (2006.01)
*C08G 18/79* (2006.01)
*C08G 18/80* (2006.01)
*C09D 175/04* (2006.01)

(52) U.S. Cl.
CPC ........ *C08G 18/2063* (2013.01); *C08G 18/6254* (2013.01); *C08G 18/778* (2013.01); *C08G 18/792* (2013.01); *C08G 18/809* (2013.01); *C09D 175/04* (2013.01)

(58) Field of Classification Search
USPC ............................ 524/588, 590; 427/379, 407
See application file for complete search history.

(56) References Cited

U.S. PATENT DOCUMENTS

| 3,168,483 A | 2/1965 | Beitchman et al. |
| 3,707,521 A | 12/1972 | De Santis |
| 3,718,614 A | 2/1973 | Smyth |
| 3,959,403 A | 5/1976 | LaRochelle |
| 4,278,783 A | 7/1981 | Taniyama et al. |
| 4,479,990 A | 10/1984 | Dixon et al. |
| 4,499,150 A | 2/1985 | Dowbenko et al. |
| 4,499,151 A | 2/1985 | Dowbenko et al. |
| 4,598,131 A | 7/1986 | Prucnal |
| 4,710,542 A | 12/1987 | Forgione et al. |
| 4,853,146 A | 8/1989 | Rorig et al. |
| 5,041,239 A | 8/1991 | Rorig et al. |
| 5,225,248 A | 7/1993 | Stephenson |
| 5,238,993 A | 8/1993 | Hsieh |
| 5,250,605 A | 10/1993 | Hazan et al. |
| 5,516,559 A | 5/1996 | Rockrath et al. |
| 5,691,439 A | 11/1997 | Slack et al. |
| 5,716,678 A | 2/1998 | Rockrath et al. |
| 5,719,251 A | 2/1998 | Wilczek et al. |
| 5,747,166 A | 5/1998 | Schwarte et al. |
| 5,747,590 A | 5/1998 | Corcoran et al. |
| 5,908,895 A | 6/1999 | Vogt-Birnbrich et al. |
| 5,985,463 A | 11/1999 | Lin et al. |
| 6,379,807 B1 * | 4/2002 | Nordstrom et al. ........... 428/447 |
| 6,403,699 B1 | 6/2002 | Rockrath et al. |
| 6,492,482 B2 | 12/2002 | Lomoelder et al. |
| 6,607,833 B1 | 8/2003 | Uhlianuk et al. |
| 7,772,320 B2 | 8/2010 | Poppe et al. |
| 7,858,732 B2 | 12/2010 | Bruchmann et al. |
| 8,013,099 B2 | 9/2011 | Poppe et al. |

(Continued)

FOREIGN PATENT DOCUMENTS

| DE | 4132430 A1 | 4/1993 |
| DE | 10103027 A1 | 7/2002 |

(Continued)

OTHER PUBLICATIONS

International Search Report of International application No. PCT/EP2008/010810 dated Apr. 28, 2009.
Written Opinion for International application No. PCT/EP2008/010810 dated Apr. 28, 2009.
International Preliminary Report on Patentability for International application No. PCT/EP2008/010810 dated Jul. 20, 2010.
Machine Translation into English of EP1334989A2.
A. Albert, et al.; "Determination of Ionization Constants by Potentiometrictitration Using a Glass Electrode"; The Determination of Ionization Constants, A Laboratory Manual, Third Edition; Chapman and Hall, London, NY (1984); pp. 14-38.
Industrial Coatings Technical Data Sheet, Basonat HI 190 B/S, BASF The Chemical Company, Dec. 2010, 3 pages.

(Continued)

*Primary Examiner* — Aiqun Li
(74) *Attorney, Agent, or Firm* — Servilla Whitney LLC

(57) ABSTRACT

The present invention relates to a coating composition comprising
(a) at least one hydroxyl-containing compound (A),
(b) at least one compound (B) having free and/or blocked isocyanate groups, and
(c) at least one phosphate-containing catalyst (C) for the crosslinking of silane groups,
(d) at least one further catalyst (D),
one or more constituents of the coating composition containing hydrolyzable silane groups, wherein the catalyst (D) is a bicyclic amine.

16 Claims, No Drawings

(56) References Cited

U.S. PATENT DOCUMENTS

| | | |
|---|---|---|
| 2002/0142169 A1 | 10/2002 | Hofacker et al. |
| 2003/0027921 A1 | 2/2003 | Speier et al. |
| 2004/0106726 A1 | 6/2004 | Joshi et al. |
| 2005/0165177 A1 | 7/2005 | Wagner et al. |
| 2005/0238899 A1 | 10/2005 | Nagata et al. |
| 2006/0045965 A1 | 3/2006 | Lin |
| 2006/0084711 A1* | 4/2006 | Stanjek et al. ............ 521/154 |
| 2006/0217472 A1* | 9/2006 | Staunton ................ 524/236 |
| 2007/0059532 A1 | 3/2007 | Ramesh et al. |
| 2007/0202341 A1* | 8/2007 | Dogan et al. ............ 428/423.1 |
| 2007/0213501 A1 | 9/2007 | Bruchmann et al. |
| 2008/0047469 A1 | 2/2008 | Poppe et al. |
| 2008/0075871 A1 | 3/2008 | Ambrose et al. |
| 2008/0245999 A1 | 10/2008 | Poppe et al. |
| 2009/0223631 A1 | 9/2009 | Poppe et al. |
| 2009/0275680 A1 | 11/2009 | Bruchmann et al. |
| 2009/0281271 A1 | 11/2009 | Bruchmann et al. |
| 2010/0015344 A1 | 1/2010 | Groenewolt et al. |
| 2010/0028544 A1 | 2/2010 | Groenewolt et al. |
| 2010/0143596 A1 | 6/2010 | Groenewolt et al. |
| 2011/0027489 A1 | 2/2011 | Groenewolt et al. |
| 2011/0045190 A1 | 2/2011 | Groenewolt et al. |
| 2011/0245406 A1 | 10/2011 | Klein et al. |
| 2011/0263789 A1 | 10/2011 | Taniguchi et al. |
| 2011/0269897 A1 | 11/2011 | Groenewolt et al. |
| 2012/0100380 A1 | 4/2012 | Groenewolt |
| 2012/0189858 A1 | 7/2012 | Poppe et al. |

FOREIGN PATENT DOCUMENTS

| | | |
|---|---|---|
| DE | 69625241 T2 | 9/2003 |
| DE | 102004050746 A1 | 4/2006 |
| DE | 60116825 T2 | 7/2006 |
| DE | 102005003299 A1 | 7/2006 |
| DE | 102005045228 A1 | 4/2007 |
| DE | 102006024823 A1 | 12/2007 |
| DE | 102007013242 A1 | 9/2008 |
| DE | 102007026722 A1 | 12/2008 |
| DE | 102007061855 A1 | 6/2009 |
| DE | 102008060454 A1 | 6/2010 |
| EP | 0008127 B1 | 4/1982 |
| EP | 0249201 A3 | 12/1987 |
| EP | 0554684 A1 | 8/1993 |
| EP | 0245700 B1 | 8/1994 |
| EP | 0626888 B1 | 5/1997 |
| EP | 0571073 B1 | 7/1997 |
| EP | 0276501 B2 | 6/1998 |
| EP | 0949308 A1 | 10/1999 |
| EP | 0692007 B1 | 12/2001 |
| EP | 1193278 A1 | 4/2002 |
| EP | 0994117 B1 | 3/2003 |
| EP | 1334989 A2 | 8/2003 |
| EP | 1273640 A3 | 1/2004 |
| EP | 0991690 B1 | 8/2004 |
| EP | 1502927 A1 | 2/2005 |
| EP | 2102263 B1 | 7/2011 |
| EP | 2091988 B1 | 2/2013 |
| JP | H05194880 A | 8/1993 |
| JP | H05239178 A | 9/1993 |
| JP | H07331136 A | 12/1995 |
| JP | 10306251 A | 11/1998 |
| JP | H11116847 A | 4/1999 |
| WO | WO9422968 A1 | 10/1994 |
| WO | WO9712945 A1 | 4/1997 |
| WO | WO0055229 A1 | 9/2000 |
| WO | WO0109260 A1 | 2/2001 |
| WO | WO0198393 A1 | 12/2001 |
| WO | WO03093343 A1 | 11/2003 |
| WO | WO2004014991 A1 | 2/2004 |
| WO | WO2004046218 A1 | 6/2004 |
| WO | WO2004104078 A1 | 12/2004 |
| WO | WO2005003340 A2 | 1/2005 |
| WO | WO2005012382 A1 | 2/2005 |
| WO | WO2005033240 A1 | 4/2005 |
| WO | WO2005090500 A1 | 9/2005 |
| WO | WO2005118677 A1 | 12/2005 |
| WO | WO2006042584 A1 | 4/2006 |
| WO | WO2006042585 A1 | 4/2006 |
| WO | WO2006042658 A1 | 4/2006 |
| WO | WO2006099054 A2 | 9/2006 |
| WO | WO2006131314 A1 | 12/2006 |
| WO | WO2007003826 A2 | 1/2007 |
| WO | WO2007003857 A3 | 1/2007 |
| WO | WO2007016234 A2 | 2/2007 |
| WO | WO2007033786 A1 | 3/2007 |
| WO | WO2007137632 A1 | 12/2007 |
| WO | WO2008074489 A1 | 6/2008 |
| WO | WO2008074490 A1 | 6/2008 |
| WO | WO2008074491 A1 | 6/2008 |
| WO | WO2008110230 A1 | 9/2008 |

OTHER PUBLICATIONS

"Dissociation Constants in Water" (Titration Method—Spectrophotometric Method—Conductometric Method); OECD Guideline for Testing of Chemicals, 112; May 12, 1981; pp. 1-7.

Römpp Lexikon "Lacke und Druckfarben," Georg Thieme Verlag, Stuttgart, 1998, pp. 250 to 252.

B. Singh, P.S. Forgione, J.a. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.

Opposition to EP 2 102 263 B1, Title: "Coating Agents Having High Scratch Resistance and Weathering Stability", Patentee: BASF Coatings GmbH, Munster, by PPG Industries Ohio, Inc., Cleveland, OH, filed with the European Patent Office on Apr. 5, 2012, 21 pages.

English Translation of International Preliminary Report on Patentability for International Application No. PCT/EP2007/011190 issued Jun. 7, 2009.

International Search Report for International Application Nol. PCT/EP2007/011190 mailed Apr. 14, 2008.

English Translation of Written Opinion for International Application No. PCT/EP2007011190 mailed Apr. 14, 2008.

English Translation of International Preliminary Report on Patentability for International Application No. PCT/EP2007/011191 issued Jun. 7, 2009.

International Search Report for International Application No. PCT/EP2007/011191 mailed Apr. 14, 2008.

English Translation of Written Opinion for International Application No. PCT/EP2007/011191 mailed Apr. 14, 2008.

English Translation of International Preliminary Report on Patentability for International Application No. PCT/EP2007/011192 issued Jun. 7, 2009.

International Search Report for International Application No. PCT/EP2007/011192 mailed Apr. 14, 2008.

English Translation of Written Opinion for International Application No. PCT/EP2007/011192 mailed Apr. 14, 20008.

English Translation of International Preliminary Report on Patentability for International Application No. PCT/EP2008/010808 issued Jul. 20, 2010.

International Search Report of International Application No. PCT/EP2008/010808 mailed Apr. 3, 2009.

Written Opinion for International Application No. PCT/EP2008/010808 mailled Apr. 3, 2009.

English Translation of International Preliminary Report on Patentability for International Application No. PCT/EP2008/010809 issued Jul. 20, 2010.

International Search Report of International Application No. PCT/EP2008/010809 mailed May 8, 2009.

Written Opinion for International Application No. PCT/EP2008/010809 mailed May 8, 2009.

English Translation of International Preliminary Report on Patentability for International Application No. PCT/EP2009/004581 issued Jan. 18, 2011.

International Search Report for International Application No. PCT/EP2009/004581 mailed Oct. 5, 2009.

Written Opinion for International Application No. PCT/EP2009/004581 mailed Oct. 5, 2009.

(56) References Cited

OTHER PUBLICATIONS

English Translation of International Preliminary Report on Patentability for International Application No. PCT/EP2009/006110 issued Jun. 7, 2011.
English Translation of International Search Report for International Application No. PCT/EP2009/006110 mailed Nov. 25, 2009.
English Translation of Written Opinion for International Application No. PCT/EP2009/006110 mailed Nov. 25, 2009.
English Translation of International Preliminary Report on Patentability for International Application No. PCT/EP2010/001422 issued Jan. 17, 2012.
English Translation of International Search Report for International Application No. PCT/EP2010/001422 mailed Jul. 5, 2010.
English Translation of Written Opinion for International Application No. PCT/EP2010/001422 mailed Jul. 5, 2010.
English Translation of International Preliminary Report on Patentability for International Application No. PCT/EP2010/001421 issued Dec. 16, 2011, 8 pages.
English Translation of International Search Report for International Application No. PCT/EP2010/001421 mailed Jul. 2, 2010, 2 pages.
English Translation of Written Opinion for International Application No. PCT/EP2010/001421 mailed Jul. 2, 2010, 7 pages.
German Patent Application DE102006059951.9 filed Dec. 19, 2006 and made available under the Patent Cooperation Treating (PCT) relating to PCT/EP2007/011191.
"Untersuchung der Reaktionskenetik von Photopolymeren im Dentalbereich", Funktionsprinzip von DSC, DMA und DEA, S. 6-24.
English translation of "Untersuchung der Reaktionskenetik von Photopolymeren im Dentalbereich"—"Investigation of the reaction kinetics of photopolymers in the dental sector", Sec. 3 Functional principle of DSC, DMA and DEA, 20 pgs.
"Dynamisch-merchanische Analyse (DMA)", S. 1-7.
English Translation of "Dynamisch-merchanische Analyse (DMA)"—"Dynamic Mechanical Analysis (DMA)", 8 pgs.
Rheometrics Instrument Support Policy, Jan. 1, 2005.
Opposition to EP 2 091 998 B1, Title: "Coating Agents Having High Scratch Resistance and Weathering Stability", Patentee: BASF Coatings GmbH, Munster, by PPG Industries, Inc., filed with the European Patent Office on Nov. 16, 2013, 14 pages.

* cited by examiner

US 9,090,732 B2

COATING COMPOSITION HAVING A HIGH SCRATCH RESISTANCE AND WEATHERING STABILITY

CROSS REFERENCE TO RELATED APPLICATIONS

This application is a National Phase Application of Patent Application PCT/EP2008/010810 filed on 18 Dec. 2008, which claims priority to DE102007061855.9, filed 19 Dec. 2007, both of which are hereby incorporated by reference in their entirety.

FIELD OF THE INVENTION

The present invention relates to coating compositions comprising
(a) at least one hydroxyl-containing compound (A),
(b) at least one compound (B) having free and/or blocked isocyanate groups, and
(c) at least one phosphorus catalyst (C) for the crosslinking of silane groups,
(d) at least one further catalyst (D),
wherein one or more constituents of the coating composition contain hydrolyzable silane groups.

BACKGROUND OF THE INVENTION

WO-A-01/98393 describes 2K (2-component) coating compositions comprising a polyol binder component and a polyisocyanate crosslinker component partly functionalized with alkoxysilyl groups. These coating compositions are used as primers and are optimized for adhesion to metallic substrates, especially aluminum substrates. Over these coating compositions, as part of an OEM finish or a refinish, it is possible to apply basecoat/clearcoat systems. In terms of scratch resistance and weathering stability, the coating compositions of WO 01/98393 are not optimized. No mention is made of the quantitative conversion of the silane groups and/ or of the isocyanate groups during the crosslinking reaction.

EP-A-0 994 117 describes moisture-curable mixtures comprising a polyol component and a polyisocyanate component which may partly have been reacted with a monoalkoxysilylalkylamine that has undergone reaction preferably to an aspartate. Although coatings formed from such mixtures do have a certain hardness, they are nevertheless of only limited suitability for OEM applications in terms of their weathering stability and, in particular, their scratch resistance.

US-A-2006/0217472 describes coating compositions which can comprise a hydroxy-functional acrylate, a low molecular mass polyol component, a polyisocyanate, and an amino-functional alkoxysilyl component, preferably bisalkoxysilylamine. Such coating compositions are used as clearcoat material in basecoat/clearcoat systems and lead to scratchproof coatings. However, they have only very limited storage qualities, and the resulting coatings have low weathering stability, particularly with respect to UV radiation in a wet/dry cycle.

WO 2006/042585 describes clearcoat materials which are suitable for OEM finishing and which as their main binder component comprise polyisocyanates whose isocyanate groups, preferably to an extent of more than 90 mol %, have undergone reaction with bisalkoxysilylamines. Clearcoat materials of this kind combine excellent scratch resistance with high chemical and weathering resistance. But there is still a need for a further improvement in the weathering stability, particularly with respect to cracking under UV irradiation in a wet/dry cycle, with retention of the high level of scratch proofing.

EP-A-1 273 640 describes 2K coating compositions composed of a polyol component and of a crosslinker component consisting of aliphatic and/or cycloaliphatic polyisocyanates, 0.1 to 95 mol % of the free isocyanate groups originally present having undergone reaction with bisalkoxysilylamine. These coating compositions can be used for OEM finishing and when fully cured combine good scratch resistance with effective resistance to environmental influences. Nevertheless, these coating compositions have a particularly strong propensity toward aftercrosslinking, with the consequence— directly after thermal curing to completion—of inadequate scratch resistance of the coatings. The significant after crosslinking likewise impacts adversely on the weathering stability, since there is an increased risk of stress cracks.

The above-described coating materials which, through the use of organofunctional silanes, include both organic and inorganic constituents are also referred to as organic-inorganic coating materials. Depending on the formulation used it is possible to produce surfaces of extreme scratch resistance.

It is known in the literature that crosslinking reactions can be accelerated by means of very different catalysts. Whereas tertiary amines or certain metal catalysts are more particularly suitable as catalysts for isocyanate crosslinking (see inter alia M. Dahm, K. Uhlig, Kunststoffhandbook 7, page 92 ff.) the silane condensation reactions are catalyzed using, more particularly, acids, including, specifically, blocked partial esters of phosphoric acid. In organic-inorganic hybrid systems of this kind there may be unwanted interactions between the particular catalysts used, since certain catalysts on the one hand accelerate one reaction and in certain circumstances inhibit the other reaction that is progressing simultaneously. It is necessary, furthermore, to take account of aspects of the environmental compatibility of catalysts. For instance, inter alia, the use of tin catalysts is only a very limited possibility in practice, since the effect of these materials on the human body is very toxic. Experimental investigations have shown that the use of an individual catalyst is generally not sufficient to accelerate both crosslinking reactions correspondingly. In practice, this frequently leads to a situation in which comparatively low conversion rates are observed, at least in the case of one of the crosslinking reactions: for example, only about 20% in the isocyanate reaction.

It was an object of the present invention to provide coating compositions, particularly for the clearcoat film in OEM finishes and automotive refinishes, that lead to a network with a high degree of weathering stability, the unwanted formation of moieties unstable to hydrolysis and weathering being very largely suppressed, in order to ensure high acid resistance. In addition, the coating compositions ought to lead to coatings which have a high degree of scratchproofing directly after thermal curing, and in particular a high retention of gloss after scratch exposure. Moreover, the coatings and coating systems, especially the clearcoat systems, ought to be able to be produced even in film thicknesses >40 μm without stress cracks occurring. This is a key requirement for the use of the coatings and coating systems, particularly of the clearcoat systems, in the technologically and esthetically particularly demanding field of automotive OEM finishing.

The intention in particular was to provide clearcoat systems featuring high resistance, particularly to cracking, under weathering with UV radiation in a wet/dry cycle, in combination with outstanding scratchproofing.

Furthermore, the new coating compositions ought to be preparable easily and with very good reproducibility, and ought not to present any environmental problems during application of the coating material.

A key problem facing the present invention is to achieve as complete crosslinking as possible for both reactions for coating materials which are cured by hydrolysis of alkoxysilane compounds and, additionally, by the reaction of isocyanate groups with hydroxyl groups. In particular the isocyanate conversion is to be increased, without the silane crosslinking being adversely affected. Surprisingly it has been found that this problem can be solved through the use of bicyclic amines for blocking phosphoric acid catalysts.

SUMMARY OF THE INVENTION

The present invention accordingly provides coating compositions, of the type specified at the outset, wherein the catalyst (D) is a bicyclic amine.

In light of the prior art it was surprising and unforeseeable for the skilled worker that the objects on which the present invention was based could be achieved by means of the coating composition of the invention.

The components of the invention can be prepared particularly easily and with very good reproducibility, and do not cause any significant toxicological or environmental problems during application of the coating material.

Advantageous embodiments of the present invention will become apparent from the dependent claims.

The coating compositions of the invention produce new coatings and coating systems, especially clearcoat systems, which are highly scratchproof and, in contrast to common, highly crosslinked scratchproof systems, are acid-resistant. Moreover, the coatings and coating systems of the invention, especially the clearcoat systems, can be produced even in film thicknesses >40 μm without stress cracks occurring. Consequently the coatings and coating systems of the invention, especially the clearcoat systems, can be used in the technologically and esthetically particularly demanding field of automotive OEM finishing. In that context they are distinguished by particularly high carwash resistance and scratch resistance. In particular, the coatings possess their higher scratch resistance directly after the curing of the coatings to completion, thereby allowing the coatings to be handled with no problems directly following the curing to completion. The resistance of the coatings of the invention to cracking under UV radiation and wet/dry cycling in the CAM180 test (to DIN EN ISO 11341 February 98 and DIN EN ISO 4892-2 November 00), moreover, in combination with a high scratch resistance, is outstanding.

It is assumed that the above-described advantageous properties are to be attributed to the full progression of the simultaneously occurring crosslinking reactions.

DETAILED DESCRIPTION OF AN EMBODIMENT OF THE INVENTION

Catalysts comprising phosphorus and nitrogen are used as catalysts (C) for the silane crosslinking. In this case, mixtures of two or more different catalysts (C) can also be used.

Examples of suitable phosphorus catalysts (C) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in the German patent application DE-A-102005045228.

Use is made more particularly as catalyst (C), however, of substituted phosphoric monoesters and phosphoric diesters, preferably from the group consisting of acyclic phosphoric diesters and cyclic phosphoric diesters, more preferably amine adducts of the phosphoric monoesters and diesters.

The acyclic phosphoric diesters (C) are selected more particularly from the group consisting of acyclic phosphoric diesters (C) of the general formula (IV):

where the radicals $R_{10}$ and $R_{11}$ are selected from the group consisting of:

substituted and unsubstituted alkyl- having 1 to 20, preferably 2 to 16, and more particularly 2 to 10 carbon atoms, cycloalkyl- having 3 to 20, preferably 3 to 16, and more particularly 3 to 10 carbon atoms, and aryl- having 5 to 20, preferably 6 to 14, and more particularly 6 to 10 carbon atoms, substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups present therein in each case containing the above-recited number of carbon atoms; and substituted and unsubstituted radical- of the above-recited kind, containing at least one, more particularly one, heteroatom selected from the group consisting of oxygen atom, sulfur atom, nitrogen atom, phosphorus atom, and silicon atom, more particularly oxygen atom, sulfur atom, and nitrogen atom; and additionally also being able to represent hydrogen (partial esterification).

The catalysts (C) are used preferably in fractions of 0.01 to 20% by weight, more preferably in fractions of 0.1 to 10% by weight, based on the nonvolatile constituents of the coating composition of the invention.

Examples of suitable catalysts (D) are 1,5-diazabicyclo [4.3.0]non-5-ene or 1,8-diazabicyclo[5.4.0]undec-7-ene.

The catalysts are used preferably in fractions of 0.01 to 20% by weight, more preferably in fractions of 0.1 to 10% by weight, based on the nonvolatile constituents of the coating composition of the invention. In this context, the amount of catalyst used also has a certain influence on the crosslinking, since a relatively low level of activity on the part of the catalyst can be partially compensated by means of correspondingly higher amounts employed.

The Structural Units Having Hydrolyzable Silane Groups

It is essential to the invention that one or more constituents of the coating composition contain hydrolyzable silane groups. Particularly suitable in this context are coating compositions wherein one or more constituents of the coating composition at least partly contain one or more, alike or different structural units of the formula (I)

with

G=identical or different hydrolyzable groups,
X=organic radical, more particularly linear and/or branched alkylene or cycloalkylene radical having 1 to 20 carbon atoms, very preferably
X=alkylene radical having 1 to 4 carbon atoms, R"=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms, x=0 to 2, preferably 0 to 1, more preferably x=0.

The structure of these silane radicals as well affects the reactivity and hence also the very substantial reaction during the curing of the coating, hence affecting the establishment of an extremely low post-crosslinking index (PCI).

With regard to the compatibility and the reactivity of the silanes it is preferred to use silanes having 3 hydrolyzable groups, i.e., x=0.

The hydrolyzable groups G may be selected from the group of halogens, more particularly chlorine and bromine, from the group of alkoxy groups, from the group of alkylcarbonyl groups, and from the group of acyloxy groups. Particular preference is given to alkoxy groups (OR').

The respective preferred alkoxy radicals (OR') may be alike or different; what is critical for the structure of the radicals, however, is to what extent they influence the reactivity of the hydrolyzable silane groups. Preferably R' is an alkyl radical, more particularly having 1 to 6 C atoms.

Particularly preferred radicals R' are those which increase the reactivity of the silane groups, i.e., represent good leaving groups. To this extent, a methoxy radical is preferred over an ethoxy radical, which is preferred in turn over a propoxy radical. With particular preference R'=ethyl and/or methyl, more particularly methyl.

The reactivity of organofunctional silanes can also be significantly influenced, furthermore, through the length of the spacers X between silane functionality and organic functional group serving for reaction with the modifying constituent. As examples of this, mention may be made of the "alpha" silanes, available from the company Wacker, in which there is a methylene group, instead of the propylene group present in the case of "gamma" silanes, between Si atoms and functional group. To illustrate this it is observed that methacryloyloxymethyltrimethoxysilane ("alpha" silane, e.g., commercial product GENIOSIL® XL 33 from Wacker) is used in preference over methacryloyloxypropyltrimethoxysilane ("gamma" silane, e.g., commercial product GENIOSIL® GF 31 from Wacker) in order to introduce the hydrolyzable silane groups into the coating composition.

Very generally, spacers which increase the reactivity of the silanes are preferred over spacers which lower the reactivity of the silanes.

In addition, the functionality of the silanes, as well, has an influence on the post-crosslinking index. By functionality in this context is meant the number of radicals of the formula (I) per molecule. The term monofunctional silane therefore refers to silanes which per silane molecule in each case introduce one radical of the formula (I) into the constituent that is to be modified. The term difunctional silane refers to silanes which per silane molecule introduce in each case two radicals of the formula (I) into the constituent.

Particular preference is given, in accordance with the invention, to coating compositions wherein the constituents have been modified with a mixture of a monofunctional silane and a difunctional silane. Difunctional silanes used in this context are more particularly those amino-functional disilanes of the formula (IIa) that are described below, and monofunctional silanes used are more particularly those silanes of the formula (IIIa) that are described later on below.

Finally, it is also possible for nonfunctional substituents on the organofunctional silane that is used to introduce the structural units (I) and/or (II) and/or (III) to influence the reactivity of the hydrolyzable silane group. This may be illustrated by way of example taking as an example bulky voluminous substituents on the amine function, which are able to reduce the reactivity of amine-functional silanes. Against this background N-(n-butyl)-3-aminopropyltrimethoxysilane is preferred before N-cyclohexyl-3-aminopropyltrimethoxysilane for the introduction of the structural units (III).

Very generally, the radicals which increase the reactivity of the silanes are preferred over radicals which lower the reactivity of the silanes.

The structural units of the formula (I) can be introduced into the constituents of the coating composition in different ways. A feature common to the various ways, however, is that the introduction of the structural units is accomplished via a reaction between the functional groups of the constituents it is intended to modify and complementary functional groups of the silane. By way of example, therefore, various possibilities for introducing the structural units (I) into the compound (A) containing hydroxyl groups and, where appropriate, further reactive groups as well, and/or into the compound (B) containing isocyanate groups, are set out below.

Use is made, more particularly in the context of Michael additions, of, for example, primary aminosilanes, such as 3-aminopropyltriethoxysilane (available for example under the brand name Geniosil® GF 93 from Wacker Chemie), 3-aminopropyltrimethoxysilane (available for example under the brand name Geniosil® GF 96 from Wacker Chemie), N-(2-aminoethyl)-3-aminopropyltrimethoxysilane (available for example under the brand name Geniosil® GF 9 and also Geniosil® GF 91 from Wacker Chem ie), N-(2-aminoethyl)-3-aminopropylmethyldimethoxysilane (available for example, under the brand name Geniosil® GF 95 from Wacker Chemie), and the like.

Use is made, more particularly in the context of additions to isocyanate-functional compounds, of, for example, secondary aminosilanes, such as, for example, bis-(2-trimethoxysilylethyl)amine, bis-(2-triethoxysilyl-ethyl)amine, bis(3-triethoxysilylpropyl)amine (available under the trade name Dynasylan® 1122 from Degussa), bis(3-trimethoxysilyl-propyl)amine (available under the trade name Dynasylan® 1124 from Degussa), bis(4-triethoxysilylbutyl)amine, N-(n-butyl)-3-aminopropyl-trimethoxysilane (available under the trade name Dynasylan® 1189 from Degussa), N-(n-butyl)-3-aminopropyltriethoxysilane, N-cyclohexyl-3-aminopropyltrimethoxysilane (available under the brand name Geniosil® GF 92 from Wacker Chemie), N-cyclohexyl-3-aminopropyltriethoxy-silane, N-cyclohexylaminomethylmethyldiethoxysilane (available from Wacker Chemie under the trade name Geniosil® XL 924), N-cyclo-hexylaminomethyltriethoxysilane (available from Wacker Chemie under the trade name Geniosil® XL 926), N-phenylaminomethyl-trimethoxysilane (available from Wacker Chemie under the trade name Geniosil® XL 973), and the like.

Epoxy-functional silanes can be used more particularly for addition to compounds with carboxylic acid or anhydride functionality. Examples of suitable epoxy-functional silanes are 3-glycidyloxypropyltrimethoxysilane (available from Degussa under the trade name Dynasylan® GLYMO), 3-glycidyloxypropyltriethoxysilane (available from Degussa under the trade name Dynasylan® GLYEO), and the like.

Anhydride—functional silanes can be employed more particularly for addition to epoxy-functional compounds. An example that may be mentioned of a silane with anhydride functionality is 3-(triethoxysilyl)propylsuccinic anhydride (available from Wacker Chemie under the trade name Geniosil® GF 20).

Silanes of this kind can be used in the context of Michael reactions or else in the context of metal-catalyzed reactions. Those exemplified are 3-methacryloyloxypropyltrimethoxysilane (available for example from Degussa under the trade name Dynasilan® MEMO, or from Wacker Chemie under the trade name Geniosil® GF 31), 3-methacryloyloxypropyltriethoxysilane, vinyltrimethoxysilane (available, among others, from Wacker Chemie under the trade name Geniosil® XL 10), vinyldimethoxymethylsilane (available from, among others, Wacker Chemie under the trade name Geniosil® XL 12), vinyltriethoxysilane (available, among others, from Wacker Chemie under the trade name Geniosil® GF 56), (methacryloyloxymethyl)methyldimethoxysilane (available, among others, from Wacker Chemie under the trade name Geniosil® XL 32), methacryloyloxymethyltrimethoxysilane (available, among others, from Wacker Chemie under the trade name Geniosil® XL 33), (methacryloyloxymethyl)methyldiethoxysilane (available, among others, from Wacker Chemie under the trade name Geniosil® XL 34), methacryloyloxymethyltriethoxysilane (available, among others, from Wacker Chemie under the trade name Geniosil® XL 36).

Silanes with isocyanate function or carbamate function are employed in particular in the context of reactions with hydroxy-functional compounds. Examples of silanes with isocyanate function are described in WO 07/03857, for example.

Examples of suitable isocyanatoalkyltrialkoxysilanes are isocyanato-propyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethyld iiso-propoxysilane, isocyanatoneohexyltrimethoxysilane, isocyanatoneo-hexyldimethoxysilane, isocyanatoneohexyldiethoxysilane, isocyanato-neohexyltriethoxysilane, isocyanatoneohexyltriisopropoxysilane, isocyanatoneohexyldiisopropoxysilane, isocyanatoisoamyltrimethoxy-silane, isocyanatoisoamylmethyldimethoxysilane, isocyanatoisoamyl-methyldiethoxysilane, isocyanatoisoamyltriethoxysilane, isocyanato-isoamyltriisopropoxysilane and isocyanatoisoamylmethyldiisopropoxy-silane. Many isocyanatoalkyltri- and -di-alkoxysilanes are available commercially, for example, under the designation SILQUEST® from OSi Specialties, Inc., a Witco Corporation company.

The isocyanatopropylalkoxysilane used preferably has a high degree of purity, more particularly a purity of at least 95%, and is preferably free from additives, such as transesterification catalysts, which can lead to unwanted side reactions.

Use is made in particular of (isocyanatomethyl)methyldimethoxysilane (available from Wacker-Chemie under the brand name Geniosil® XL 42), 3-isocyanatopropyltrimethoxysilane (available from Wacker-Chemie under the brand name Geniosil® XL 40), and N-dimethoxy(methyl) silylmethyl O-methylcarbamate (available from Wacker— Chemie under the brand name Geniosil® XL 65).

More particular preference is given in accordance with the invention to coating compositions comprising at least one hydroxyl-containing compound (A) and at least one isocyanato-containing compound (B), wherein one or more constituents of the coating composition contain, as additional functional components, between 2.5 and 97.5 mol %, based on the entirety of structural units (II) and (III), of at least one structural unit of the formula (II)

—N(X—SiR"x(OR')3-x)n(X'—SiR"y(OR')3-y)m (II)

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
n=0 to 2, m=0 to 2, m+n=2, and x,y=0 to 2,
and
between 2.5 and 97.5 mol %, based on the entirety of structural units (II) and (III), of at least one structural unit of the formula (III)

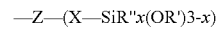  (III), where
Z=—NH—, —NR—, —O—, with
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl.
x=0 to 2, and
X, R', R" being as defined for formula (II).

Very particular preference is given to coating compositions wherein one or more constituents of the coating composition contain between 5 and 95 mol %, more particularly between 10 and 90 mol %, with particular preference between 20 and 80 mol %, and very particularly between 30 and 70 mol %, based in each case on the entirety of structural units (II) and (III), of at least one structural unit of the formula (II) and between 5 and 95 mol %, more particularly between 10 and 90 mol %, with particular preference between 20 and 80 mol %, and very particularly between 30 and 70 mol %, based in each case on the entirety of structural unit (II) and (III), of at least one structural unit of the formula (III).

The Hydroxyl-Containing Compound (A)

As hydroxyl-containing compound (A) it is preferred to use low molecular mass polyols and also oligomeric and/or polymeric polyols.

Low molecular mass polyols used are, for example, diols, such as, preferably, ethylene glycol, neopentyl glycol, 1,2-propanediol, 2,2-dimethyl-1,3-propanediol, 1,4-butanediol, 1,3-butanediol, 1,5-pentane-diol, 2,2,4-trimethyl-1,3-pentanediol, 1,6-hexanediol, 1,4-cyclohexane-dimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

Low molecular mass polyols of this kind are preferably admixed in minor proportions to the oligomeric and/or polymeric polyol component (A).

The preferred oligomeric and/or polymeric polyols (A) have mass-average molecular weights Mw>500 daltons, as measured by means of GPC (gel permeation chromatography), preferably between 800 and 100 000 daltons, in particular between 1000 and 50 000 daltons. Particularly preferred are polyester polyols, polyurethane polyols, polysiloxane polyols, and, in particular, polyacrylate polyols and/or polymethacrylate polyols, and their copolymers, referred to as polyacrylate polyols below. The polyols preferably have an OH number of 30 to 400 mg KOH/g, in particular between 100 and 300 KOH/g. The glass transition temperatures, as measured by DSC (differential thermal analysis), of the polyols are preferably between −150 and 100° C., more preferably between −120° C. and 80° C.

Suitable polyester polyols are described for example in EP-A-0 994 117 and EP-A-1 273 640. Polyurethane polyols are prepared preferably by reacting polyester polyol prepolymers with suitable di- or polyisocyanates and are described in EP-A-1 273 640, for example.

Suitable polysiloxane polyols are described for example in WO-A-01/09260, and the polysiloxane polyols recited therein can be employed preferably in combination with further polyols, especially those having relatively high glass transition temperatures.

The polyacrylate polyols that are very particularly preferred in accordance with the invention are generally copolymers and preferably have mass-average molecular weights Mw of between 1000 and 20 000 daltons, in particular between 1500 and 10 000 daltons, measured in each case by means of gel permeation chromatography (GPC) against a polystyrene standard. The glass transition temperature of the copolymers is generally between −100 and 100° C., in particular between −50 and 80° C. (measured by means of DSC measurements). The polyacrylate polyols preferably have an OH number of 60 to 250 mg KOH/g, in particular between 70 and 200 KOH/g, and an acid number of between 0 and 30 mg KOH/g.

The hydroxyl number (OH number) indicates how many mg of potassium hydroxide are equivalent to the amount of acetic acid bound by 1 g of substance during acetylation. For the determination, the sample is boiled with acetic anhydride-pyridine and the acid formed is titrated with potassium hydroxide solution (DIN 53240-2). The acid number here indicates the number of mg of potassium hydroxide consumed in neutralizing 1 g of the respective compound of component (b) (DIN EN ISO 2114).

Hydroxyl-containing monomer units used are preferably hydroxyalkyl acrylates and/or hydroxyalkyl methacrylates, such as, in particular, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate.

Further monomer units used for the polyacrylate polyols are preferably alkyl methacrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

Further monomer units which can be used for the polyacrylate polyols are vinylaromatic hydrocarbons, such as vinyltoluene, alpha-methylstyrene or, in particular, styrene, amides or nitriles of acrylic or methacrylic acid, vinyl esters or vinyl ethers, and, in minor amounts, in particular, acrylic and/or methacrylic acid.

In a further embodiment of the invention the hydroxyl-containing compound A as well as the hydroxyl groups comprises structural units of the formula (I) and/or of the formula (II) and/or of the formula (III).

Structural units of the formula (II) can be introduced into the compound (A) by incorporation of monomer units containing such structural units, or by reaction of polyols containing further functional groups with a compound of the formula (IIa)

HN(X—SiR"x(OR')3-x)n(X'—SiR"y(OR')3-y)m    (IIa), where the substituents are as defined above. For the reaction of the polyol with the compound (IIa), the polyol, correspondingly, has further functional groups which react with the secondary amino group of the compound (IIa), such as acid or epoxy groups in particular. Inventively preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltrimethoxysilyl)amine and/or bis(4-butyltriethoxysilyl)amine. Bis(3-propyltrimethoxysilyl)amine is especially preferred. Aminosilanes of this kind are available for example under the brand name DYNASILAN® from DEGUSSA or Siiquest® from OSI.

Monomer units which carry the structural elements (II) are preferably reaction products of acrylic and/or methacrylic acid or of epoxy-containing alkyl acrylates and/or methacrylates with the above-mentioned compounds (IIa).

Structural units of the formula (III) can be introduced into the compound (A) by incorporation of monomer units containing such structural units or by reaction of polyols containing further functional groups with a compound of the formula (IIIa)

H—Z—(X—SiR"x(OR')3-x)    (IIIa), where the substituents are as defined above. For the reaction of the polyol with the compound (IIIa), the polyol, correspondingly, has further functional groups which react with the functional group —ZH of the compound (IIIa), such as acid, epoxy or ester groups in particular. Inventively preferred compounds (IIIa) are omega-aminoalkyl- or omega-hydroxyalkyltrialkoxysilanes, such as, preferably, 2-aminoethyltrimethoxysilane, 2-aminoethyltriethoxysilane, 3-aminopropyltrimethoxy-silane, 3-aminopropyltriethoxysilane, 4-aminobutyltrimethoxysilane, 4-aminobutyltriethoxysilane, 2-hydroxyethyltrimethoxysilane, 2-hydroxy-ethyltriethoxysilane, 3-hydroxypropyltrimethoxysilane, 3-hydroxypropyl-triethoxysilane, 4-hydroxybutyltrimethoxysilane, and 4-hydroxybutyl-triethoxysilane. Particularly preferred compounds (IIa) are N-(2-(tri-methoxysilyl)-ethyl)alkylamines, N-(3-(trimethoxysilyl)propyl)alkyl-amines, N-(4-(trimethoxysilyl)butyl)alkylamines, N-(2-(triethoxy-silyl)ethyl)alkylamines, N-(3-(triethoxysilyl)propyl)alkylamines and/or N-(4-(triethoxysilyl)butyl) alkylamines. N-(3-(Trimethoxysilyl)propyl)butyl-amine is especially preferred. Aminosilanes of this kind are available for example under the brand name DYNASILAN® from DEGUSSA or Silquest® from OSI.

Monomer units which carry the structural elements (III) are preferably reaction products of acrylic and/or methacrylic acid or of epoxy-containing alkyl acrylates and/or methacrylates, and also, in the case of hydroxy-functional alkoxysilyl compounds, transesterification products of alkyl acrylates and/or methacrylates, especially with the above-mentioned hydroxy- and/or amino-functional alkoxysilyl compounds (IIIa).

The Isocyanate-Containing Compounds (B)

As component (B), the coating compositions of the invention comprise one or more compounds having free, i.e., unblocked, and/or blocked isocyanate groups. Preferably the coating compositions of the invention comprise compounds (B) having free isocyanate groups. The free isocyanate groups of the isocyanato-containing compounds B may also, however, be used in blocked form. This is preferably the case when the coating compositions of the invention are used as one-component systems.

The di- and/or polyisocyanates which serve as core structures for the isocyanato-containing compounds (B) used with preference in accordance with the invention are preferably conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred polyisocyanates are hexamethylene 1,6-diisocyanate, isophorone diisocyanate, and 4,4'-methylenedicyclohexyl diisocyanate, their biuret dimers and/or isocyanurate trimers.

In a further embodiment of the invention the polyisocyanates are polyisocyanate prepolymers containing urethane structural units which are obtained by reacting polyols with a stoichiometric excess of aforementioned polyisocyanates. Polyisocyanate prepolymers of this kind are described for example in U.S. Pat. No. 4,598,131.

The isocyanato-containing compounds (B) that are especially preferred in accordance with the invention, functionalized with the structural units (II) and (III), are prepared with preference by reacting the aforementioned di- and/or polyisocyanates with the aforementioned compounds (IIa) and (IIIa), by reacting
between 2.5 and 90 mol %, preferably 5 to 85 mol %, more preferably 7.5 to 80 mol %, of the isocyanate groups in the core polyisocyanate structure with at least one compound (IIa) and
between 2.5 and 90 mol %, preferably 5 to 85 mol %, more preferably 7.5 to 80 mol %, of the isocyanate groups in the core polyisocyanate structure with at least one compound (IIIa).

The total fraction of the isocyanate groups reacted with the compounds (IIa) and (IIIa) in the polyisocyanate compound (B) is between 5 and 95 mol %, preferably between 10 and 90 mol %, more preferably between 15 and 85 mol % of the isocyanate groups in the core polyisocyanate structure. Particularly in the case of a high degree of silanization, i.e., when a high proportion of the isocyanate groups, more particularly at least 50 mol %, having been reacted with the compounds (IIa)/(IIIa), the isocyanate groups are reacted advantageously with a mixture of the compounds (IIa) and (IIIa).

Particularly preferred compounds (IIa) are bis(2-ethyltrimethoxy-silyl)amine, bis(3-propyltrimethoxysilyl)amine, bis(4-butyltrimethoxy-silyl)amine, bis(2-ethyltriethoxysilyl)amine, bis(3-propyltrimethoxy-silyl)amine and/or bis(4-butyltriethoxysilyl)amine. Bis(3-propyltrimethoxy-silyl)amine is especially preferred. Aminosilanes of this kind are available for example under the brand name DYNASILAN® from DEGUSSA or Silquest® from OSI.

Preferred compounds (IIIa) are 2-aminoethyltrimethoxysilane, 2-aminoethyltriethoxsilane, 3-aminopropyltrimethoxysilane, 3-amino-propyltriethoxysilane, 4-aminobutyltrimethoxysilane, 4-aminobutyltri-ethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxybutyltrimethoxysilane, and 4-hydroxybutyltriethoxysilane.

Particularly preferred compounds (IIIa) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkyl-amines, N-(3-(triethoxysilyl)propyl)alkylamines and/or N-(4-(triethoxy-silyl)butyl)alkylamines. N-(3-(Trimethoxysilyl)propyl)butylamine is especially preferred. Aminosilanes of this kind are available for example under the brand name DYNASILAN® from DEGUSSA or Silquest® from OSI.

Especially preferred isocyanato-containing compounds (B) are reaction products of hexamethylene 1,6-diisocyanate and/or isophorone diisocyanate, and/or their isocyanurate trimers, with bis(3-propyltrimethoxysilyl)amine and N-(3-(trimethoxysilyl)propyl)butylamine. The reaction of the isocyanato-containing compounds (B) with the compounds (IIa) and (IIIa) takes place preferably in inert gas at temperatures of not more than 100° C., preferably of not more than 60° C.

The free isocyanate groups of the isocyanato-containing compounds B can also be used in blocked form. This is preferably the case when the coating compositions of the invention are used as one-component systems. For the purpose of blocking it is possible in principle to use any blocking agent which can be used for blocking polyisocyanates and which has a sufficiently low unblocking temperature. Blocking agents of this kind are very familiar to the skilled worker. It is preferred to use blocking agents as described in EP-A-0 626 888 and EP-A-0 692 007.

The Combination of Components A and B, and Further Components of the Coating Composition The weight fraction of hydroxyl-containing compounds A to be employed, based on the weight fraction of the isocyanato-containing compounds B, is dependent on the hydroxy equivalent weight of the polyol and on the equivalent weight of the free isocyanate groups of the polyisocyanate B.

It is preferred that, in the coating composition of the invention, one or more constituents contain between 2.5 to 97.5 mol %, based on the sum of structural units (II) and (III), of at least one structural unit (II) and between 2.5 to 97.5 mol %, based on the sum of structural units (II) and (III), of at least one structural unit (III).

The coating compositions of the invention contain preferably between 2.5% and 97.5%, more preferably between 5% and 95%, very preferably between 10% and 90%, and in particular between 20% and 80%, by weight, based on the amount of nonvolatile substances in the coating composition, of the hydroxyl-containing compounds (A), and preferably between 2.5% and 97.5%, more preferably between 5% and 95%, very preferably between 10% and 90%, and in particular between 20% and 80%, by weight, based on the amount of nonvolatile substances in the coating composition, of the isocyanato-containing compounds (B).

Based on the sum of the functional groups critical for crosslinking in the coating composition of the invention, formed from the fractions of the hydroxyl and isocyanate groups and also the fractions of the structural elements (I) and/or (II) and/or (III), the structural elements (I) and/or (II) and/or (III) are present preferably in fractions of 2.5 to 97.5 mol %, more preferably between 5 and 95 mol %, and very preferably between 10 and 90 mol %.

In a further embodiment of the invention the structural elements (I), (II) and/or (III) may additionally also be part of one or more further components (E), different than the components (A) and (B), in which case the criteria to be applied are those specified above. By way of example it is possible as component (E) to use oligomers or polymers containing alkoxysilyl groups, such as, for example, the poly(meth)acrylates specified in patents and patent applications U.S. Pat. Nos. 4,499,150, 4,499,151 or EP-A-0 571 073, as carriers of structural elements (III), or to use the compounds specified in WO-A-2006/042585, as carriers of structural elements (II). Generally speaking, components (E) of this kind are used in fractions of up to 40%, preferably up to 30%, more preferably up to 25%, by weight, based on the nonvolatile constituents of the coating composition.

The weight fractions of the polyol A and of the polyisocyanate B are preferably selected such that the molar equivalent ratio of the unreacted isocyanate groups of the isocyanate-containing compounds (B) to the hydroxyl groups of the hydroxyl-containing compounds (A) is between 0.9:1 and 1:1.1, preferably between 0.95:1 and 1.05:1, more preferably between 0.98:1 and 1.02:1.

Where the compositions are one-component coating compositions, a selection is made of the isocyanato-containing compounds (B) whose free isocyanate groups have been blocked with the blocking agents described above.

In the case of the inventively preferred 2-component (2K) coating compositions, a coating component comprising the hydroxyl-containing compound (A) and also further components, described below, is mixed conventionally with a further coating component, comprising the isocyanato-containing compound (B) and, where appropriate, further of the components described below, this mixing taking place shortly before the coating composition is applied; generally speaking, the coating component that comprises the compound (A) comprises the catalyst and also part of the solvent.

Solvents suitable for the coating compositions of the invention are in particular those which, in the coating composition, are chemically inert toward the compounds (A) and (B) and also do not react with (A) and (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1%, more preferably not more than 0.5%, by weight, based on the solvent.

Besides the compounds (A), (B), and (D) it is possible additionally to use further binders (F), which preferably are able to react and form network points with the hydroxyl groups of the compound (A) and/or with the free isocyanate groups of the compound (B) and/or with the alkoxysilyl groups of the compounds (A), (B) and/or (D).

By way of example it is possible to use amino resins and/or epoxy resins as component (F). Suitable amino resins are the typical, known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Generally speaking, such components (F) are used in fractions of up to 40%, preferably up to 30%, more preferably up to 25%, by weight, based on the nonvolatile constituents of the coating composition.

The coating composition of the invention may further comprise at least one typical, known coatings additive in effective amounts, i.e. in amounts preferably up to 30%, more preferably up to 25%, and in particular up to 20% by weight, in each case based on the nonvolatile constituents of the coating composition.

Examples of suitable coatings additives are:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)$_3$ groups;
wetting agents such as siloxanes, fluorine compounds, carboxylic monoesters, phosphoric esters, polyacrylic acids and their copolymers, or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium, and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
and/or flame retardants.

In a further embodiment of the invention the coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are employed for automotive refinish, which are preferably between 30 and 90° C.

The coating compositions of the invention produce new cured coatings, especially coating systems, more particularly clearcoat systems; moldings, especially optical moldings; and self-supporting films, all of which are highly scratchproof and in particular are stable to chemicals and to weathering. The coatings and coating systems of the invention, especially the clearcoat systems, can in particular be produced even in film thicknesses >40 μm without stress cracks occurring.

For these reasons the coating compositions of the invention are of excellent suitability as decorative, protective and/or effect-imparting, highly scratchproof coatings and coating systems on bodies of means of transport (especially motor vehicles, such as motor cycles, buses, trucks or automobiles) or parts thereof; on buildings, both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM finishing and also of automotive refinish. With particular preference the coating compositions of the invention are used in multistage coating methods, particularly in methods where a pigmented basecoat film is first applied to an uncoated or precoated substrate and thereafter a film with the coating compositions of the invention is applied.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C.

The coats produced with the coating composition of the invention are notable in particular for an especially high chemical stability and weathering stability and also for a very good carwash resistance and scratchproofing, in particular for an excellent combination of scratchproofing and weathering stability with respect to UV radiation in a wet/dry cycle.

In a further preferred embodiment of the invention, the coating composition of the invention is used as a transparent clearcoat material for coating plastics substrates, especially transparent plastics substrates. In this case the coating compositions include UV absorbers, which in terms of amount and type are also designed for effective UV protection of the plastics substrate. Here as well, the coating compositions are notable for an outstanding combination of scratchproofing and weathering stability with respect to UV radiation in a wet/dry cycle. The plastics substrates thus coated are used preferably as a substitute for glass components in automobile construction, the plastics substrates being composed preferably of polymethyl methacrylate or polycarbonate.

EXAMPLES

Preparation Example 1

Preparation of the Partially Silanized Curing Agent on the Basis of HDI Trimers

A reaction vessel was equipped with a condenser and charged with nitrogen. Subsequently the reaction vessel was charged with 57.3 parts by weight of trimerized isocyanate (Basonat® HI 100, available from BASF AG, Ludwigshafen) and 3.88 parts by weight of triethyl orthoformate. In a separate vessel, 2.82 parts by weight of N-(3-trimethoxysilylpropan-1-yl)-N-n-butylamine (Dynasilan® 1189 from Degussa) were mixed with 36.89 parts by weight of N,N-bis(3-trimethoxysilylpropan-1-yl)amine (Dynasilan® 1124 from Degussa), with nitrogen blanketing. The resulting mixture of the amino-functional silanes was added slowly dropwise and with stirring to the initial isocyanate charge, at a rate such that the reaction temperature did not exceed 60° C. Following the addition, the reaction mixture was stirred at 60° C. until the titrimetrically determined isocyanate content was 4.9%. At that point the mixture was cooled to room temperature.

The solids (30 minutes, 130° C.) of the silanized isocyanate thus obtained was determined as being 60.10%.

Preparation Example 2

Preparation of a Polyacrylate Polyol

A reactor flushed with nitrogen and fitted with a condenser was charged with 759.61 parts by weight of solvent naphtha, and this initial charge was heated to 145° C. with stirring.

In parallel to this, two separate feeds were prepared. Feed 1 consisted of 488.10 parts by weight of ethylhexyl methacrylate, 213.54 parts by weight of styrene, 183.04 parts by weight of n-butyl methacrylate, 183.04 parts by weight of 2-hydroxyethyl acrylate, 457.60 parts by weight of 4-hydroxybutyl acrylate, and 32.50 parts by weight of acrylic acid. Feed 2 consisted of 62.54 parts by weight of solvent naphtha and 152.53 parts by weight of peroxide TBPEH. When the temperature had reached 145° C., feed 2 was metered in slowly and at a uniform rate over a time of 285 minutes. 15 minutes after the start of feed 2, feed 1 was metered into the reactor slowly and at a uniform rate over a period of 240 minutes. After the end of the metered addition of feed 2, the reaction mixture was stirred for post polymerization at 145° C. for 120 minutes more.

The solids content of the resulting product was determined as being 65.65%, the acid number as 15.5 mg KOH/g (based on the solids), and the viscosity (at 23° C.) as 21 dPa s. The OH number was found to be 174.7.

Clearcoat Formulations

|  | Experiment 1 - reference | Experiment 2 - inventive | Experiment 3 - comparative example |
|---|---|---|---|
| Acrylate resin from preparation example 2 | 59.04 | 59.04 | 59.04 |
| Solvent naphtha | 29.52 | 29.52 | 29.52 |
| Triethyl orthoformate | 3.00 | 3.00 | 3.00 |
| BYK 301 ® surface additive | 0.32 | 0.32 | 0.32 |
| TINUVIN 384-2 ® light stabilizer | 1.52 | 1.52 | 1.52 |
| TINUVIN 292 ® light stabilizer | 1.30 | 1.30 | 1.30 |
| NACURE 4167 ® amine neutralized phosphate catalyst | 5.30 | 5.30 | 5.30 |
| Triethylamine | 0 | 0 | 3.00 |
| DBN (30% strength solution in butanol) | 0 | 0.10 | 0 |

For the preparation of the 2K clearcoat materials, the following mixtures were prepared from millbase and curing agent:

|  | Experiment 1 - reference | Experiment 2 - inventive | Experiment 3 - comparative example |
|---|---|---|---|
| Addition of 100 parts by weight of curing agent as per preparation example 1 to the following amount of millbase | 100 | 100.1 | 103.0 |

For the preparation of two-component (2K) clearcoats, the first components prepared in each case in accordance with the details above were homogenized with the below-mentioned amounts of the second component (curing agent as per preparation example 1) and applied directly after homogenization. For this purpose, metal test panels were used which had each been coated with a customary and known cathodically deposited, thermally cured electrodeposition coat, a customary and known, thermally cured surfacer coat, and a film, subjected to preliminary drying at 80° C. for 10 minutes, of a commercially customary, conventional, black basecoat from BASF Coatings AG. The basecoat film and the clearcoat film were cured jointly at 140° C. for 22 minutes. The resulting basecoat had a thickness of 7.5 μm, the resulting clearcoat a thickness of approximately 35 μm.

To evaluate the effect of the individual catalysts on the conversion rate in the isocyanate reaction, the conversion of the isocyanates was monitored by means of IR spectroscopy during the curing process at 140° C. over a period of 30 minutes. The corresponding results are compiled in Table 1.

|  | Experiment 1 | Experiment 2 | Experiment 3 |
|---|---|---|---|
| Isocyanate conversion after 5 minutes' curing at 140° C. | 40% | 47% | 17% |
| Isocyanate conversion after 30 minutes' curing at 140° C. | 43% | 53% | 30% |

Table 1: isocyanate conversion determined by IR spectroscopy for curing at 140° C. As the examples show, the isocyanate conversion is increased by the addition of DBN, in comparison to the unmodified reference, by 10% after 30 minutes. Even right at the beginning of curing, however, a conversion increased by 7% can be measured, in comparison to the reference specimen—experiment 1.

The results show that the formulation with DBN leads to an increased isocyanate conversion, whereas the addition of triethylamine to formulations of this kind shows an opposite effect.

The evaluation of the further bands does not show any change during curing between experiment 1 and experiment 3, which suggests that the silane crosslinking remains unaffected by the addition of DBN.

Concentrations of added amines higher than those shown in the examples are preferably not to be used in the clearcoat formulations, since they lead to yellowing on overbake and also give rise to an unacceptable odor nuisance.

It is general knowledge in the art that a higher isocyanate conversion leads ultimately to better product properties, in qualities including weathering, by virtue of the fact that there is only very limited occurrence, or none at all, of after-crosslinking reactions, which are manifested more particularly in an improved acid resistance. The inventive and comparative examples show that 1,5-diazabicyclo[4.3.0]non-5-ene (DBN) and 1,8-diazabicyclo[5.4.0]undec-7-ene (DBU) have a positive influence on isocyanate crosslinking, while triethylamine (TEA) and diazabicyclooctane (DABCO) have negative consequences.

The invention claimed is:

1. A coating composition for application to a substrate comprising
   (a) at least one hydroxyl-containing compound (A);
   (b) at least one compound (B) having free and/or blocked isocyanate groups;
   (c) at least one phosphorus-containing catalyst (C) comprising phosphorus and nitrogen, for the crosslinking of silane groups; and
   (d) at least one further catalyst (D) that is a bicyclic amine,
   wherein one or more constituents of the coating composition contain hydrolyzable silane groups, the isocyanate groups react with the at least one hydroxyl-containing compound (A), and the resulting coating composition is isocyanate-free; wherein, upon curing of the coating composition, a coat that is chemical- and weather-stable is formed.

2. The coating composition of claim 1, wherein the catalyst (D) is an unsaturated bicyclic amine.

3. The coating composition of claim 1, wherein the catalyst (D) is 1,5-diazabicyclo[4.3.0]non-5-ene or 1,8-diazabicyclo[5.4.0]undec-7-ene.

4. The coating composition of claim 1, wherein one or more constituents of the coating composition at least partly contain one or more, alike or different structural units of the formula (I)

$$—X—Si—R''_xG_{3-x} \quad (I)$$

wherein
G=identical or different hydrolyzable groups,
X=organic radical,
R''=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl, and
x =0 to 2.

5. The coating composition of claim 4, wherein one of more constituents of the coating composition contain
between 2.5 and 97.5 mol % based on the entirety of structural units (II) and (III), of at least one structural unit of the formula (II)

$$—N(X—SiR''_x(OR')_{3-x})_n(X'—SiR''_y(OR')_{3-y})_m \quad (II)$$

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl,
X and X'=linear and/or branched alkylene or cycloalkylene radical having 1 to 20 carbon atoms,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
n=0 to 2,
m=0 to 2,
m+n=2, and
x and y=0 to 2, and
between 2.5 and 97.5 mol %, based on the entirety of structural units (II) and (III), of at least one structural unit of the formula (III)

$$—Z—(—X—SiR''_x(OR')_{3-x}) \quad (III),$$

where
Z=—NH—, —NR—, —O—, where
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
x=0 to 2, and
X, R', and R'' being as defined for formula (II).

6. The coating composition of claim 5, wherein one or more constituents of the coating composition contain between 5 and 95 mol %, based in each case on the entirety of structural units (II) and (III), of at least one structural unit of the formula (II) and
between 5 and 95 mol %, based in each case on the entirety of structural units (II) and (III), of at least one structural unit of the formula (III).

7. The coating composition of claim 6, wherein the structural elements (II) and (III) are present in fractions of 2.5 to 97.5 mol %, based in each case on the sum of the functional groups for crosslinking in the coating composition, formed from the fractions of the hydroxyl and isocyanate groups and from the fractions of the structural elements (II) and (III).

8. The coating composition of claim 5, wherein the at least one compound (B) comprises at least one of the group of structural unit (I), structural unit (II), structural unit (III), and combinations thereof.

9. The coating composition of claim 8, wherein, in the at least one compound (B),
between 2.5 and 90 mol %, of the isocyanate groups in the polyisocyanate structure have undergone reaction to structural units (II) and
between 2.5 and 90 mol % of the isocyanate groups in the polyisocyanate structure have undergone reaction to structural units (III), and the total fraction of the isocyanate groups in the polyisocyanate structure that have undergone reaction to structural units (II) and (III) is between 5 and 95 mol %.

10. The coating composition of claim 8, wherein the polyisocyanate structure is selected from the group of 1,6-hexamethylene diisocyanate, isophorone diisocyanate, and 4,4'-methylenedicyclohexyl diisocyanate, the biuret dimers of the aforementioned polyisocyanates and/or the isocyanurate trimers of the aforementioned polyisocyanates.

11. The coating composition of claim 1, wherein the at least one hydroxyl-containing compound (A) comprises at least one poly(meth)acrylate polyol.

12. The coating composition of claim 1, wherein the catalyst (D) is present in the coating composition in an amount of 0.01% to 3% by weight, based on the solids content of said composition.

13. The coating composition of claim 1, wherein the at least one phosphorus-containing catalyst (C) is selected from an amine adduct of an acyclic phosphonic diester, a cyclic phosphonic diester, an acyclic diphosphonic diester, a cyclic diphosphonic diester, an acyclic phosphoric diester or a cyclic phosphoric diester.

14. A multistage coating method which comprises applying a pigmented basecoat film to an uncoated or precoated substrate and thereafter applying a film of the coating composition as claimed in any one of claims 1 to 12.

15. The multistage coating method of claim 14, wherein, following the application of the pigmented basecoat film, the applied basecoat material is first dried at temperatures from room temperature to 80° C. and, following the application of the coating composition of claim 16, the system is cured at temperatures from 30 to 200° C. for a time of 1 min up to 10 h.

16. The multistage coating method of claim 15 wherein the coating composition of claim 16 is a clearcoat material used in automotive OEM finishing or automotive refinish.

* * * * *